June 17, 1958     A. A. MEYER     2,838,967
POSITIONING APPARATUS
Filed Oct. 4, 1954     5 Sheets-Sheet 1
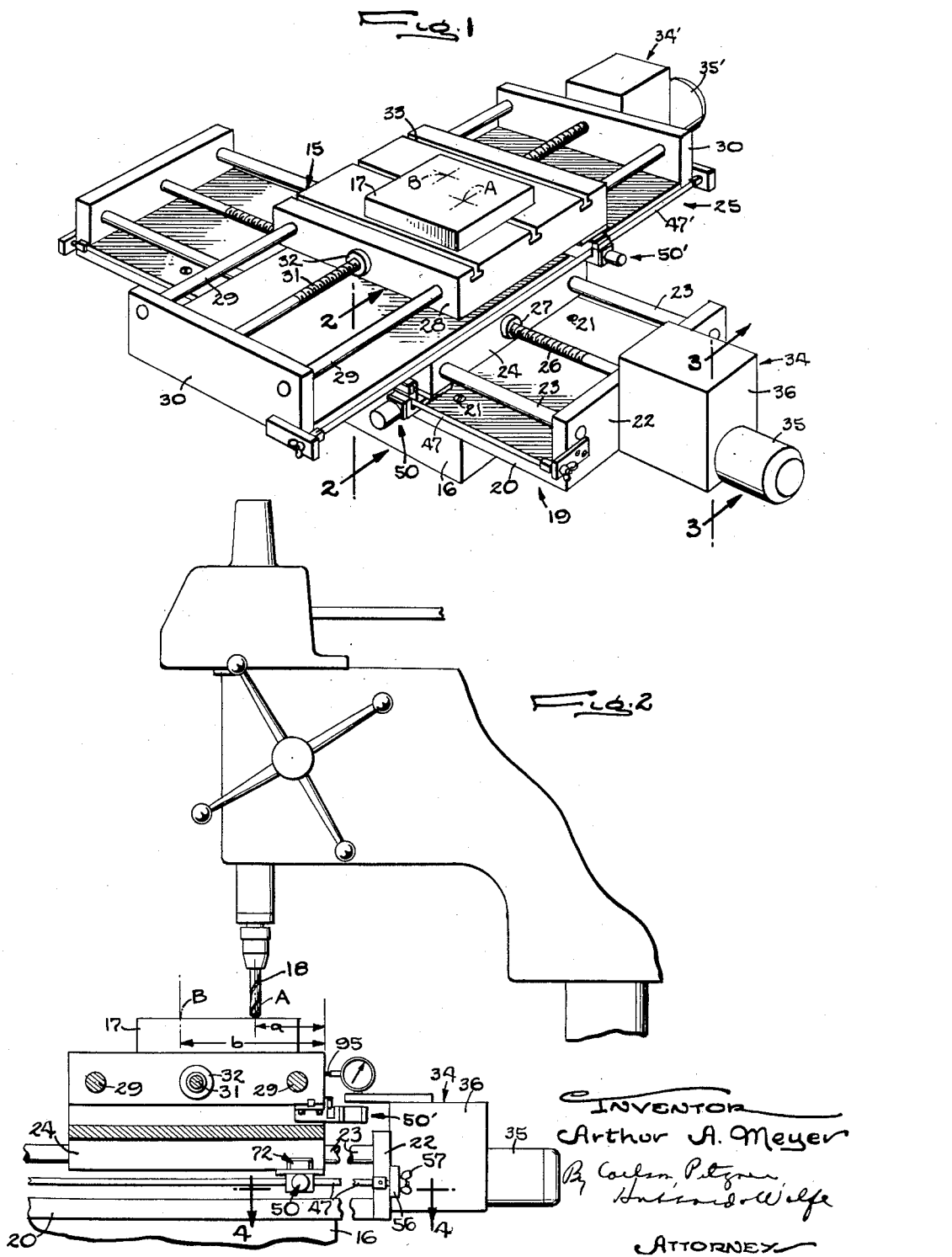

June 17, 1958
A. A. MEYER
2,838,967
POSITIONING APPARATUS
Filed Oct. 4, 1954
5 Sheets-Sheet 2
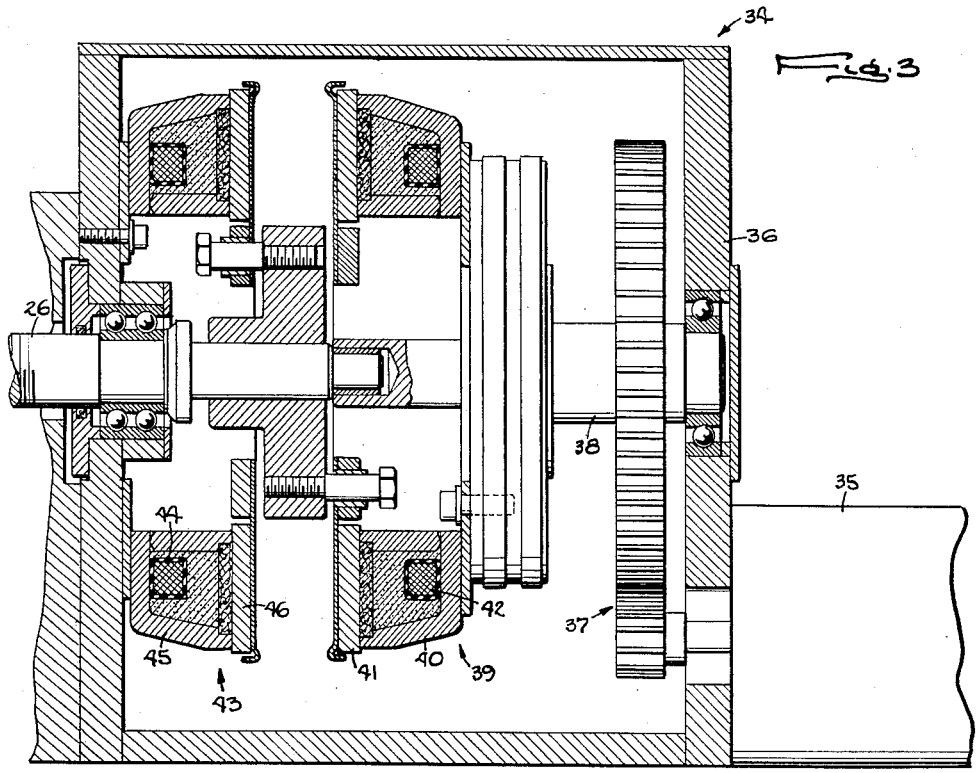
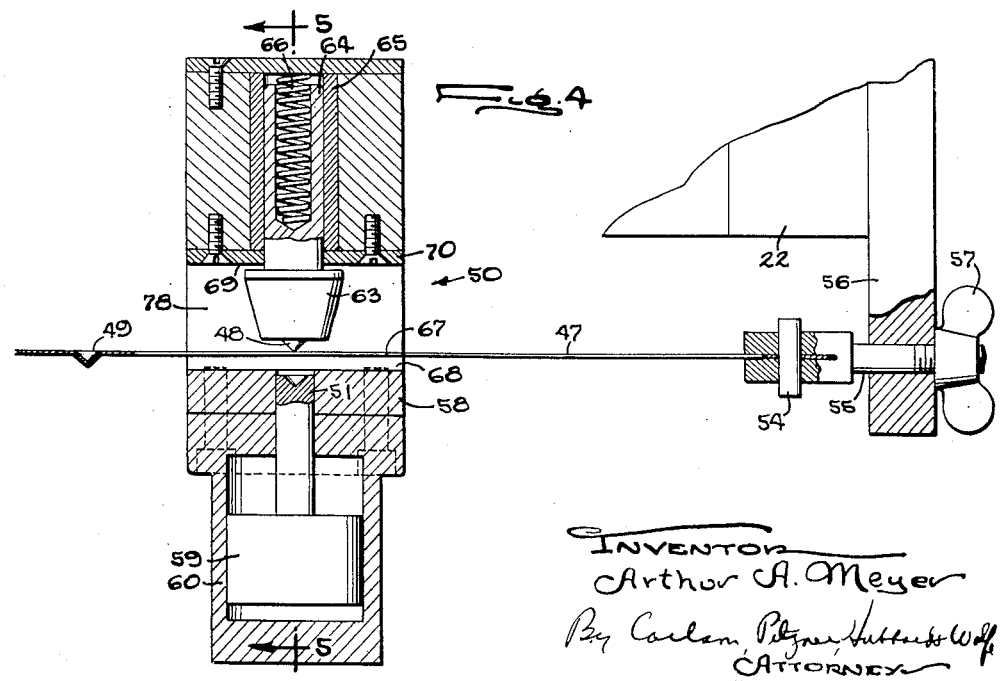
INVENTOR
Arthur A. Meyer
By Carlsen, Pitzner, Hubbard Wolf
ATTORNEY

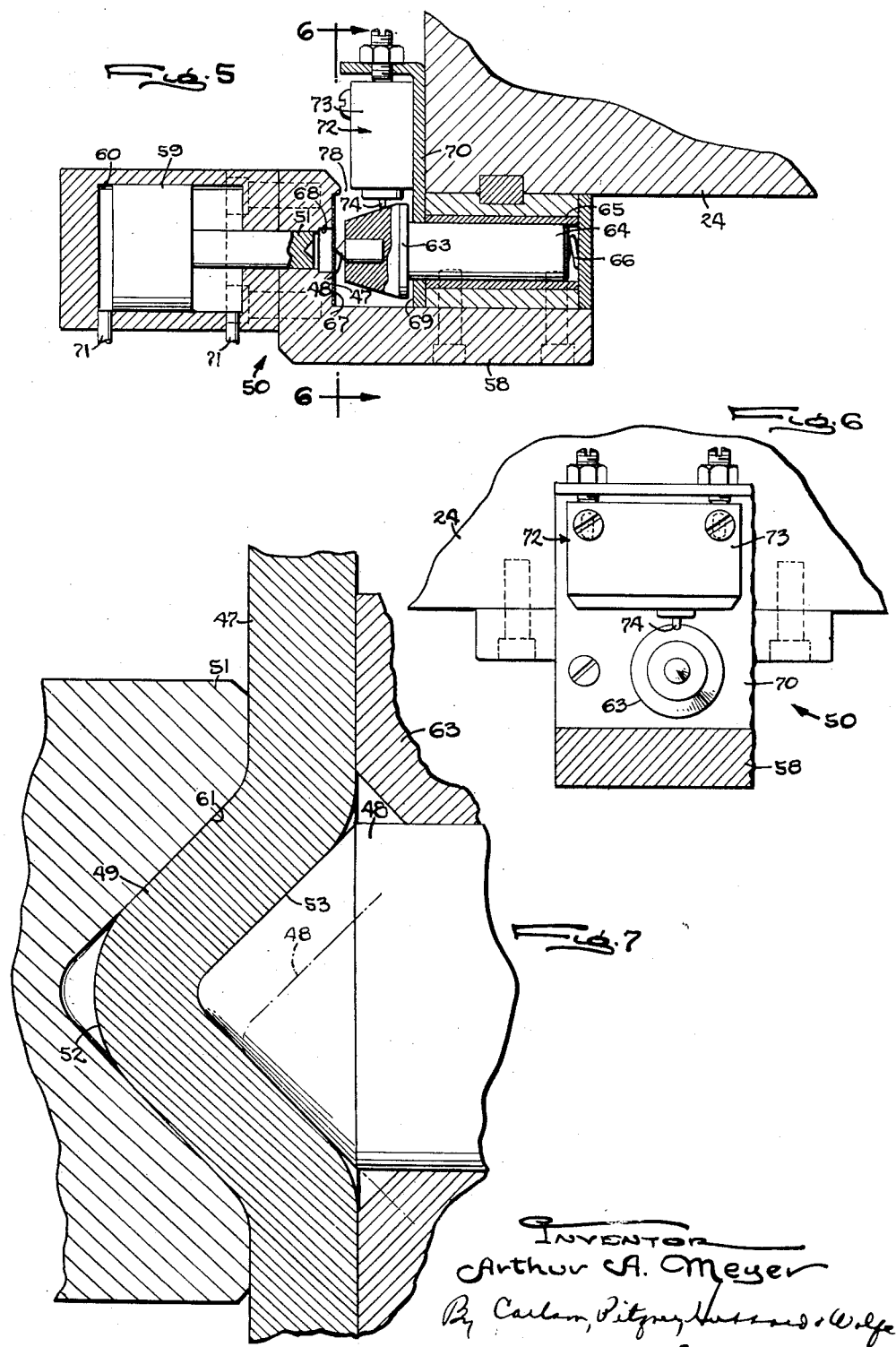

June 17, 1958 A. A. MEYER 2,838,967
POSITIONING APPARATUS
Filed Oct. 4, 1954 5 Sheets-Sheet 5
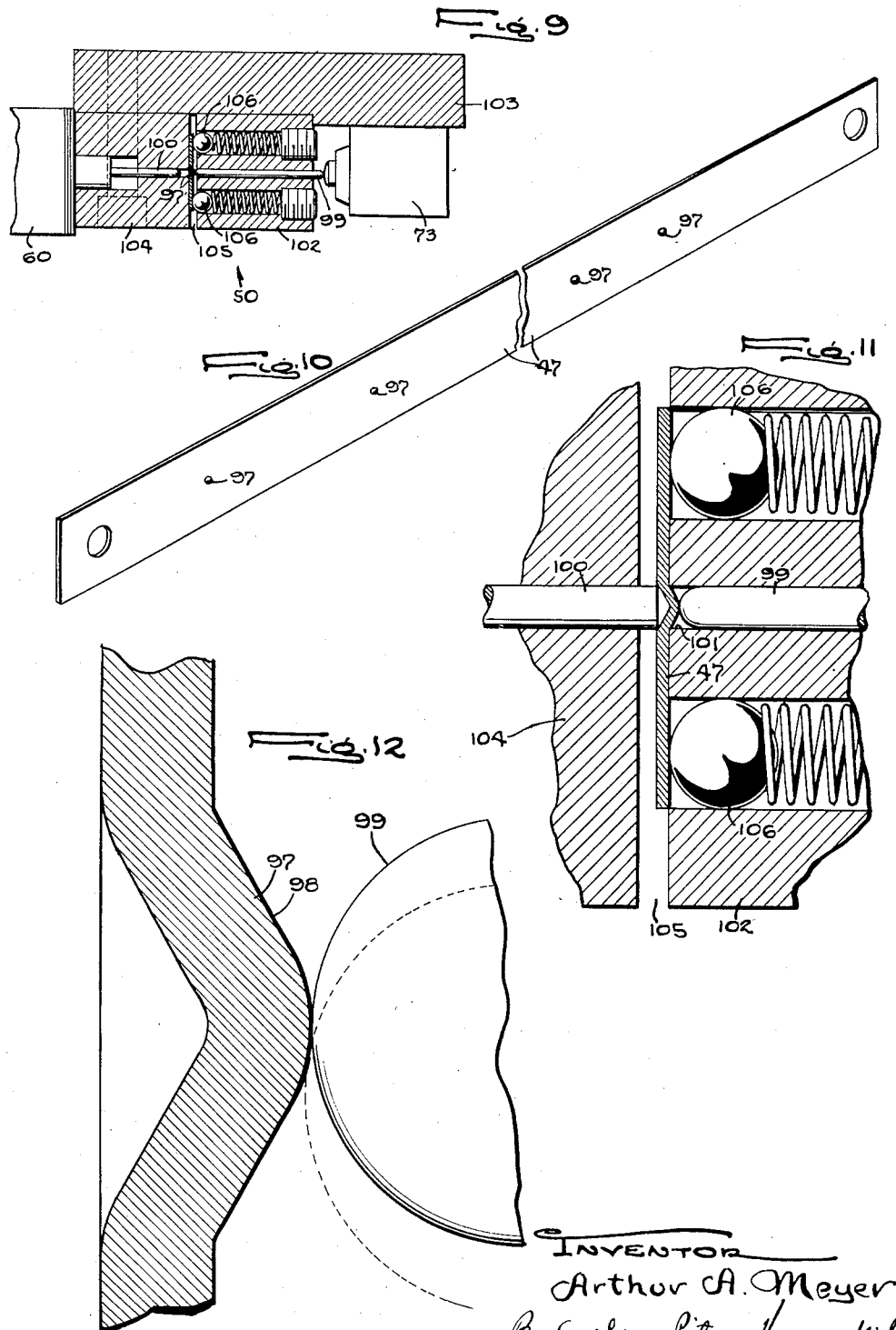

United States Patent Office 2,838,967
Patented June 17, 1958

2,838,967

POSITIONING APPARATUS

Arthur A. Meyer, Beloit, Wis., assignor to Warner Electric Brake & Clutch Company, South Beloit, Ill., a corporation of Illinois Application October 4, 1954, Serial No. 459,977

9 Claims. (Cl. 77—63)

This invention relates to apparatus for controlling the relative positions of two parts such as the tool and work supports of a machine tool in accordance with a pattern. More particularly, the invention relates to positioning apparatus including a pattern mounted on one of the machine parts and having control elements spaced along a direction of relative movement of the parts and cooperating with sensing elements on the other part to control a power actuator by which such movement is effected.

The general object of the invention is to provide improved apparatus of the above character which is simple and inexpensive in construction, which provides a high degree of accurracy, and which enables the pattern to be formed and located in proper relation to the sensing elements quickly and easily.

Another object is to form the pattern in a novel manner in the same machine in which it is to be used and to sense the control elements with the pattern in the same position relative to the machine parts thereby avoiding the loss of time and possibilities of inaccuracies resulting from mounting the pattern on the machine after the control elements have been formed in other apparatus.

A further object is to shape the control and sensing elements and locate the same in a novel manner to facilitate formation and sensing of the control elements without changing the position of the pattern while still maintaining a high degree of accuracy.

A more detailed object is to locate the pattern forming and sensing elements in a single unit to enable a control element to be sensed when the machine parts are in the same positions they occupy during formation of the control element.

The invention also resides in the novel manner of combining the pattern forming and sensing elements with power actuated mechanism to form a self-contained unit adapted to be mounted on the base of a machine tool and to locate the work support thereof at any point in a plane relative to the tool support.

Other objects and advantages of the invention will become apparent from the following detailed description taken in connection with the accompanying drawings, in which—

Figure 1 is a perspective view of a positioning unit embodying the novel features of the present invention.

Figs. 2 and 3 are fragmentary sectional views taken along the lines 2—2 and 3—3 respectively of Fig. 1.

Fig. 4 is a fragmentary sectional view taken along the line 4—4 of Fig. 2.

Fig. 5 is a fragmentary sectional view taken along the line 5—5 of Fig. 4.

Fig. 6 is a fragmentary sectional view taken along the line 6—6 of Fig. 5.

Fig. 7 is an enlarged fragmentary view similar to Fig. 4 with the parts in different positions.

Fig. 9 is a view similar to Fig. 5 of a modified pattern forming and sensing unit.

Fig. 10 is a perspective view of a pattern formed with the modified forming unit.

Fig. 11 is a fragmentary enlarged view similar to Fig. 8 with the parts in different positions.

Fig. 12 is a fragmentary enlarged view similar to Fig. 8.

Figure 8:
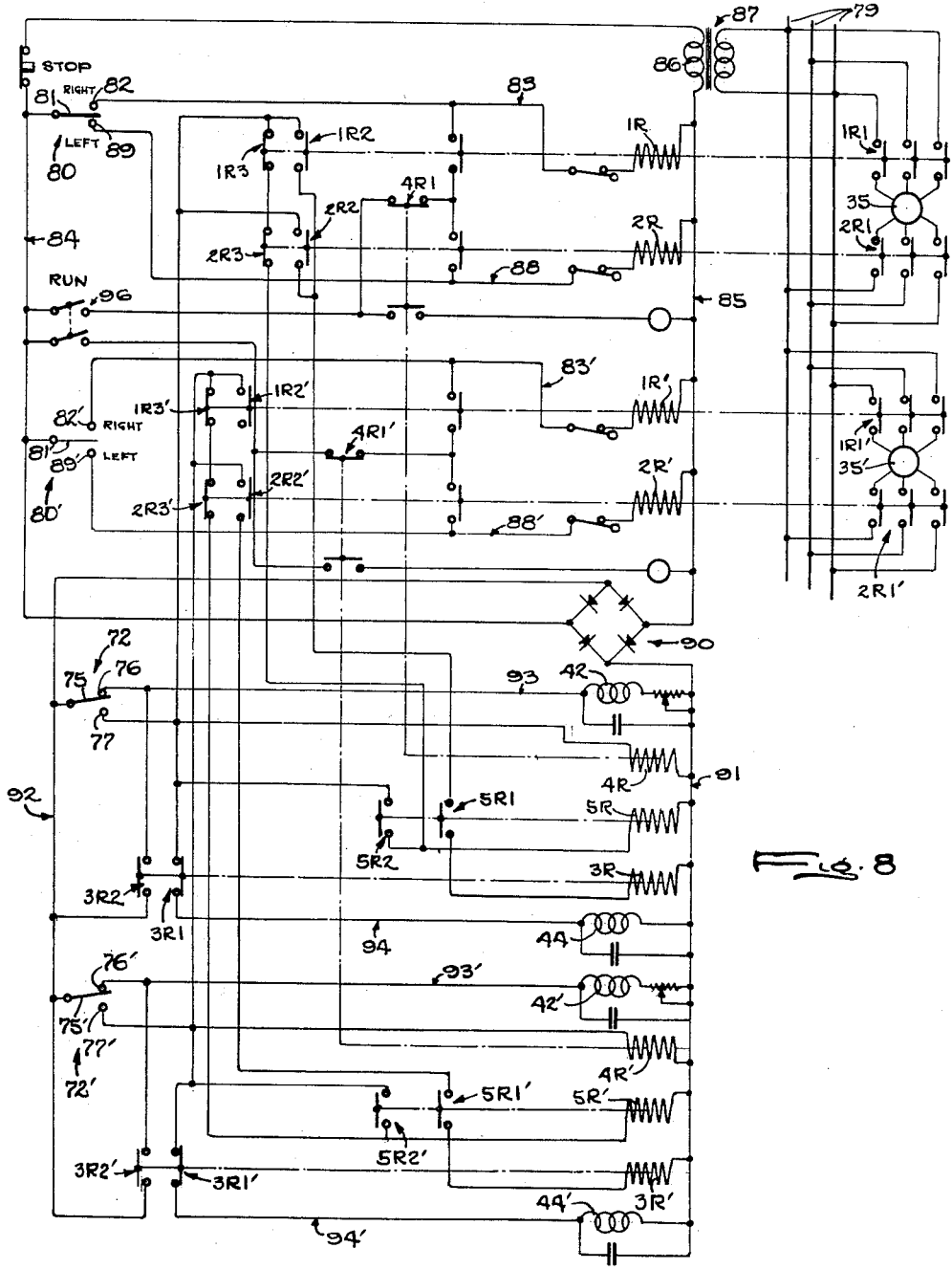
Fig. 8 is a wiring diagram of control circuits for the positioning apparatus.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the drawings, the invention is shown for purposes of illustration embodied in a self-contained work supporting and cross feeding unit 15 which is adapted to be mounted on the work support 16 of a machine tool and to support a workpiece 17 for movement in transverse directions to locate the same at any point in a plane. For example, the workpiece may be shifted to present different centers A and B thereon in alinement with the axis of a tool such as a drill 18. The unit includes a base 19 comprising a horizontal bottom plate 20 apertured to receive bolts 21 for securing the plate to the machine work support 16 and having upstanding end plates 22 secured thereto and spanned by parallel guide rods 23 defining a guideway. A block 24 on the underside of a carriage 25 slidably receives the rods 23 and is shifted back and forth along the same by a feed mechanism including a screw 26 rotatably supported at opposite ends on the base end plates and threaded intermediate its ends into a nut 27 on the carriage block 24.

The carriage 25 supports a flat work table 28 and is similar in construction to the base 19 with parallel guide rods 29 spanning upright end plates 30 and extending transversely of and generally perpendicular to the base rods. A feed screw 31 journaled in the end plates is threaded into a nut 32 on the table to shift the latter back and forth along the rods 29. The workpiece 17 is secured to the upper side of the table by bolts projecting upwardly from T-slots 33 therein.

Power for rotating the carriage feed screw 26 is derived from a torque producing unit 34 (Figs. 1 and 3) including a motor 35 mounted on the outer side of a casing 36 on one end of the base 19 and having its shaft connected through reduction gears 37 to a driving shaft 38. The latter is hollow at one end to receive and be supported by one end of the feed screw 26 and is coupled to the latter by a clutch 39 of the electromagnetic friction type having a magnet core 40 fast on the driving shaft and an armature 41 mounted on the screw for rotation therewith. Herein, the clutch is a friction device of the type which is disclosed in U. S. Letters Patent to John G. Oetzel, No. 2,554,874, and in which the core 40 encloses a multiple turn annular winding 42 and is of U-shaped cross section having radially spaced pole pieces terminating in axially facing pole faces spanned by and adapted for frictional gripping engagement with the armature. A brake 43 of similar construction for stopping the screw quickly includes a winding 44 enclosed by a magnet core 45 which is secured to the casing and is adapted for gripping engagement with an armature 46 mounted on the screw 26 to rotate therewith but slide axially relative thereto. A similar torque producing unit 34' including a motor 35' is mounted on the carriage for turning and stopping the table screw 31, the parts of this unit having reference characters similar to the carriage unit but primed.

Relative movement of the carriage and base members 19 and 25 is under the control of a pattern 47 carried by one member, herein the base, and sensing elements including a feeler 48 carried by the other member and cooperating with control elements 49 on the pattern. A similar pattern 47' and sensing elements are provided on the carriage 25 and the table 28 respectively to control relative movement of these parts. Generally, location of one of the workpiece centers A and B in alinement with the drill axis is effected by positioning the control elements along the table in accordance with the distances of each center from reference lines such as the side edges of the table and by energizing the respective motors and clutches to advance the carriage and table along their guideways until the sensing elements detect the corresponding control elements. Then, in response to such detection, the motors and clutches are deenergized and the brakes are energized.

To provide accuracy in positioning the base 19 and the carriage 25 relative to each other and to simplify formation of the control elements 49 on the pattern 47 and location of the latter properly on the base preliminary to drilling holes in a succession of workpieces, the invention contemplates formation of the control elements after the pattern blank has been mounted on the base and when it is in the same position it occupies during sensing of the control elements by the feeler 48. The invention also resides in the shape of each control element to permit such formation thereof and in the construction of the apparatus for forming and feeling the elements. To these ends, the positioning unit 15 also includes a novel pattern forming and sensing unit 50 which is mounted on the carriage 25 to move therewith relative to the pattern and which carries both the feeler 48 and a power actuated member 51 for forming the control elements. To facilitate such formation and feeling of the control elements with the pattern 47 in the same position on the base, the pattern blank is an elongated flat metal tape and each control element 49 is a deformation of the tape having a convex surface 52 defining a projection on one side of the tape and a concave surface 53 defining a recess on the other side of the tape. The control element is generally conical or rounded so that the feeler which shifts transversely of the tape upon engagement with the element has the same motion regardless of the direction from which the feeler approaches the control element.

The tape 47 is mounted on the base 19 by transverse pins 54 (Fig. 4) which extend through apertures at opposite ends of the tape and are carried by bolts 55 extending through bars 56 rigid with the end plates and having wing nuts 57 threaded thereon for drawing the tape taut. The feler and forming unit 50 includes a bracket 58 bolted to the underside of the carriage block 24 and supporting the feeler 48 and the forming member 51 for shifting movement back and forth transversely of the tape. In order to sense each control element 49 in the same relative positions of the base 19 and carriage 25 in which the element is formed and without changing the positions of the forming and feeling parts, the feeler is disposed on the opposite side of the tape from the forming element and in alinement therewith.

In the preferred form of the invention shown in Figs. 1 to 7, the forming element 51 is the outer end of the rod of a piston 59 slidable in a cylinder 60 on the bracket 58 and is shaped as a female stamping die having a conical recessed surface 61. The male backing die also is conical and, in the preferred construction, is the feeler 48 itself. Herein, the feeler is a replaceable point carried by an enlarged conical head 63 of a hollow cylindrical plug 64 slidable axially in a bushing 65 on the bracket 58, the extreme outer end of the point being rounded to reduce wear on the tape. A spring 66 within the plug acts between the latter and the bracket to urge the feeler against the tape and the tape against a flat backing surface 67 along which the tape slides during the sensing operation. This surface is recessed as indicated at 68 (Fig. 5) longitudinally of the tape to receive the convex surface 52 of each control element.

To form a control element 49, pressure fluid is admitted to the head end of the cylinder 60 and the forming die 51 advances with the piston and into engagement with the tape 47 from a retracted position behind the backing surface 67 as shown in Figs. 4 and 5. The tape is shifted bodily thereby relative to the bracket 58 and away from the backing surface to shift the feeler axially and inwardly. Such movement of the feeler is limited by engagement of the outer side of the head with a stop surface 69 on a plate 70 of the bracket, the tape then being pressed between the two dies to form the control element as shown in Fig. 7. The forming die is retracted by admitting pressure fluid to the rod end of the cylinder 60 permitting the tape to shift reversely and against the backing surface under the action of the spring 66. Pressure fluid may be supplied and its flow may be controlled by suitable manually operated apparatus (not shown) well known in the art, the fluid being admitted to and exhausted from the cylinder through ports 71.

During the sensing operation, the backing surface 67 and the feeler 48 slide along the opposite flat sides of the tape 47 when the carriage 25 shifts relative to the base 19 along the rods 23. As the feeler enters the recess 53 of a control element 49, it shifts axially and transversely of the tape. Such inward transverse movement is utilized to give a signal by mounting a switch 72 on the bracket plate 70 for actuation by the enlarged feeler head 63, the switch controlling the operation of the power unit 34. Herein, the switch is of the self-contained type enclosed in a casing 73 and having an actuator 74 movable back and forth with a snap action between two positions in which a movable contact 75 (Fig. 8) engages different fixed contacts 76 and 77. The switch casing is adjustably secured by screws to the bracket plate 70 for engagement and shifting of the switch actuator by the conical exterior of the head (see Figs. 5 and 6). When the latter shifts inwardly toward the backing surface 67, the switch actuator also shifts inwardly to move the contact 75 out of engagement with the fixed contact 76 and into engagement with the contact 77, the movable contact shifting back into engagement with the fixed contact 76 as the feeler shifts away from the backing surface. A similar pattern 47' and forming and feeler unit 50' are mounted on the carriage 19 and the table 28 respectively to control the power unit 34' for positioning these parts relative to each other.

In the operation of the novel positioning apparatus described above, let it be assumed that the self-contained unit 15 with a workpiece 17 secured to the table 28 thereof has been mounted on the machine table 16 and that it is desired to make patterns for locating the centers A and B in axial alinement with the drill 18. First, two blank tapes 47 and 47' are mounted on the base 19 and the carriage 25 to extend parallel to the guide rods 23 and 29 within a slot 78 defined by the backing and stop surfaces 67 and 69 and between the backing surface and the feeler of each of the forming and feeler units 50 and 51'. Then, the motors 35 and 35' are energized selectively through manually controlled circuits to bring the first center A into alinement with the drill.

Since the control circuits for the motor 35 and the clutch and brake windings 42' and 44' of the table shifting power unit 34' are identical with those of the carriage shifting unit 34, only the circuits for the latter will be described in detail, the circuit elements of the table unit bearing similar but primed reference characters. The manual switches and other elements of the control circuits may be located at a suitable stationary control panel (not shown) mounted, for example, on a part of the drilling machine or a separate table and connected to the power units 34 and 34' and the feeler switches 72 and 72' by suitable flexible conduits enclosing the circuit conductors.

The carriage shifting motor 35 is connected to supply lines 79 (Fig. 8) for rotation in opposite directions through normally open contacts 1R1 and 2R1 of two relays 1R and 2R whose energizing circuits are under the control of a direction switch 80. The latter is operable, when a movable contact 81 thereof is shifted into engagement with a fixed contact 82, to complete a circuit through the coil of the relay 1R and a conductor 83 between two conductors 84 and 85 which are connected to opposite ends of the secondary 86 of a transformer 87 whose primary is connected across two of the supply lines 79. The relay 1R thus is energized and the motor contacts 1R1 are closed to energize the carriage motor 35 for rotation in a direction to shift the carriage in one direction, for example, to the left as viewed in Fig. 1. A similar circuit is completed through the coil of the relay 2R and a conductor 88 to close the motor contacts 2R1 for rotation of the carriage motor in the opposite direction by shifting the movable contact 81 into engagement with another fixed contact 89.

Direct current for energizing the carriage clutch and brake windings 42 and 44 is derived from a full wave rectifier 90 whose input terminals are connected to the transformer secondary 86 through the conductors 84 and 85 and whose output terminals are connected to two conductors 91 and 92. A series circuit between the latter and through the carriage clutch winding 42 and a conductor 93 is completed by engagement of the movable contact 75 of the feeler switch 72 with the fixed contact 76 when the feeler 48 is engaging a flat portion of the tape 47. The energizing circuit for the brake winding 44 includes normally closed contacts 3R1 of a relay 3R and a conductor 94 and is closed in response to shifting of the movable contact 75 into engagement with the other fixed feeler switch contact 77 when the feeler 48 shifts transversely of the tape 47 upon engagement with the control element 49.

With the control circuits described thus far and with blank tapes 47 and 47' mounted on the base 19 and the carriage 25, the clutch windings 42 and 42' are energized continuously and the carriage 25 and the table 28 may be jogged in opposite directions along the guideways 23 and 29 and relative to the tapes to position the workpiece 17 relative to the drill 18 by selective manipulation of the direction switches 80 and 80'. The proper location of the carriage 25 relative to the base 19 for formation of the control element 49 for the first workpiece center A on the tape 47 may be determined in any suitable manner well known in the art, for example, by direct measurement of the spacing between two points fixed relative to the work table 28 and the drill axis respectively in a direction extending longitudinally of the tape. Herein, such measurement is made with a gauge adjustably mounted on the base 19 and having a sensing member 95 (Fig. 2) positioned to abut a side wall of the table, the gauge indicating when the drill axis is spaced from a reference edge of the table a distance indicated at $a$ in Fig. 2, equal to the spacing of the center A from this edge.

As soon as the drill axis is spaced the desired distance $a$ from the reference edge of the work table 28, pressure fluid is admitted to the head end of the cylinder 60 to advance the forming element 51 against the tape 47 and shift the latter relative to the mounting bracket 58 and the feeler head 63 into engagement with the stop surface 69 to form the control element 49. The forming element 51 then is retracted by admitting pressure fluid to the rod end of the cylinder, the tape being shifted back into engagement with the backing surface 67 by the spring 66 acting through the feeler.

To form the control element on the tape 47 for the second center B, the carriage switch 80 is actuated for shifting the carriage along the guide rods 23 to space the drill axis from the reference edge of the work table 28, the same distance, indicated at $b$ in Fig. 2, as the second center B and the forming element 51 is advanced and retracted as described above. The control elements on the table positioning tape 47' are formed in a similar manner.

In the use of the apparatus after the two patterns 47 and 47' are formed, the operation is as follows after a new workpiece has been clamped to the table 28 in the same position as the one used in the pattern formation and each of the carriage 19 and the table 25 has been located at one end of its range of movement, for example, to the left for the carriage and upwardly for the table as viewed in Fig. 1. The carriage direction switch 80 is actuated to energize the relay 1R and connect the motor 35 to the supply lines 79 for shifting the carriage to the right. To maintain these circuits after the relay pulls in and the movable contact 81 of the direction switch has been released to return to a neutral position between the fixed contacts 82 and 89, pull-in of the relay closes normally open contacts 1R2 thereof in a circuit extending between the relay and the transformer conductor 84 and through normally open contacts 4R1 of a relay 4R and a run-jog control switch 96, the latter being open during the pattern forming operation but remaining closed during the pattern controlled operation. The energizing circuit for the relay 4R extends through the contacts 75, 77 of the feeler switch 72 and is completed for opening of the contacts 4R1 in the motor relay holding circuit when the feeler engages a control element 49 to close the feeler switch contacts 75, 77.

The carriage continues to advance to the right along its guide rods 23 and the feeler 48 rides along the flat portion of the tape 47 until the feeler moves into the recess 53 of the control element 49 corresponding to the second center B and shifts transversely of the tape during its movement longitudinally thereof. After the feeler has shifted transversely a distance far enough to actuate the feeler switch, the movable contact 75 of the latter is shifted out of engagement with the contact 76 in the clutch winding circuit and into engagement with the contact 77 in the circuits for the brake winding 44 and the holding relay 4R. The motor 35 and the clutch 39 are deenergized and the brake 43 is energized to stop the carriage feed screw 26 with the feeler contacting the control element and the feeler switch contacts 75 and 77 closed.

The brake 43 remains energized and the clutch 39 and motor relays 1R and 2R are deenergized until the direction switch 80 is actuated again manually to energize the desired motor relay. To enable the clutch to be energized and the brake to be deenergized in response to actuation of the direction switch while the feeler switch contacts 75 and 76 are held open by the feeler 48, a system of interlocking relay control circuits is provided. This system includes the relay 3R whose normally closed contacts 3R1 are in the brake circuit and which has normally open contacts 3R2 in a clutch energized circuit by-passing the feeler switch 72. The energized circuit for this relay includes normally open parallel connected contacts 1R2 and 2R2 of the motor relays and normally open contacts 5R1 of a second interlocking relay 5R which is energized through the feeler switch contacts 75 and 77 and series connected normally closed contacts 1R3 and 2R3 of the motor relays 1R and 2R, the second interlocking relay also having normally open holding contacts 5R2 connected between the relay coil and the feeler switch contact 77.

With the above interlocking system, the second relay 5R thereof is energized upon closure of the feeler switch contacts 75 and 77 by the feeler and closure of both of the motor relay contacts 1R3 and 2R3 upon deenergization of the motor relays. Upon pull-in of the relay 5R, its holding circuit is closed at the contacts 5R2 and its normally open contacts 5R1 are closed in series with either of the motor relay contacts 1R2 or 2R2 so that, when the direction switch 80 is actuated and one of the motor relays 1R and 2R is energized, the first interlocking relay 3R is energized to interrupt the brake circuit at the contacts 3R1 and complete a clutch circuit at the contacts 3R2. The carriage then is advanced along the base guideway 23 and the feeler 48 moves along the control element and transversely of the tape 47 to permit opening of the feeler switch contacts 75 and 77. This interrupts the circuit to the holding relay 4R for the motor relay circuits and also the holding circuit for the second interlocking relay 5R. The interlocking circuits thus are returned to their original conditions in preparation to initiate stopping of the carriage when the feeler switch is actuated by engagement of the feeler with the next control element on the tape 47. The power unit 34′ for shifting the table 28 operates in a similar manner under the control of the feeler and direction switches 72′ and 80′ to advance the table successively to the positions determined by the control elements on the tape 47′.

In positioning the carriage 25 accurately relative to the base 19 in response to transverse shifting of the feeler 48 upon engagement with a control element 49, it is desirable to stop the carriage when the center of the control element is on the axis of the feeler. To accomplish this where there is a lag between actuation of the switch 72 by the feeler and stopping of the carriage by energization of the brake 39 due, for example, to the inductance of the brake winding 44, the position of the feeler switch casing 73 is adjusted on the bracket plate 70 for actuation of the switch as the feeler is approaching the center of the concave control surface 53 but when the feeler axis is spaced from such center as shown in phantom in Fig. 7. This spacing is determined in accordance with the speed of the carriage to compensate for the time lag so that the axis of the feeler and the center of the control surface 53 are coincident when the carriage is stopped. To permit adjustment of such spacing of the feeler axis and the center of the control surface while still providing uniformity of actuation of the switch each time the feeler engages the control surface, it is preferred to make the latter conical over the portion thereof engaged by the feeler. With this shape of control surface, the feeler, upon engaging the surface during advance of the feeler longitudinally of the tape at a constant rate, also shifts inwardly and transversely of the tape at a constant rate all of the way to the bottom of the surface where the center thereof is on the feeler axis.

Where less accuracy in the positioning of the carriage 25 relative to the base 19 is desired, the forming and feeling unit 50 may be constructed as shown in Figs. 9 to 12 to form a control element 97 having an outwardly projecting convex surface 98 which constitutes the control surface engaged by the feeler 99. As in the preferred construction of Figs. 1 to 7 the forming element 100 and the feeler 99 of the modified construction are alined axially on opposite sides of the tape 47. The forming element 100, however, is a male die member and the cooperating female member is the defining edge of one end of a bore 101 slidably receiving the feeler 99 and formed in a feeler block 102 which is secured to a bracket 103 adapted to be mounted on the underside of the carriage block 24. As shown in Fig. 11, the punch or male die 100 is conical at its outer end and is approximately the same size as the cooperating bore 101. The punch 100 is slidably mounted in a forming block 104 on the bracket 103 and is carried by the rod of a piston in a cylinder 60 for advance and retraction of the punch when pressure fluid is admitted to opposite ends of the cylinder as in the preferred construction. When the control element is formed with these parts by advance of the punch as shown in Fig. 11, the convex control surface 98 is generally conical at its base but has a rounded center on its outermost portion.

The feeler 99 of the modified construction of Figs. 9 to 12 is a straight pin slidable axially in the bore 101 and abutting at one end against the actuator 74 of the switch 72. At its other end, the pin is rounded to slide along the tape 47 and into engagement with the projecting convex surface 98 and shifts axially away from the tape upon engaging the control surface 98, the spring force on the switch actuator 74 yieldably urging the latter and the feeler pin toward the tape. During the forming operation, the tape 47 is shifted against the feeler block 102 and across a slot 105 between the blocks. Spring urged balls 106 in the feeler block act between the latter and the tape to shift the tape back across the slot and hold the same against a backing surface on the forming block 104 during the feeling operation.

When the feeler pin 99 is on the conical part of the convex surface 98 and moving toward the center of the element, the ratio of axial shift of the pin to transverse shift is constant until the pin leaves the conical part and moves onto the rounded center part. There, the pin moves axially at a slower and changing rate providing less accuracy than in the preferred construction in which the feeler shifts axially at a constant rate to the center of the concave surface 53.

By locating both the forming and sensing elements 51 and 48 on one of the machine parts which are to be positioned relative to each other, it is possible to mount the pattern blank 47 on the other machine part before the control elements 49 are formed and in the same position it is to occupy during sensing of the control elements. This makes possible the elimination of the operation of relocating the pattern on the base after the control elements are formed. Such location of the sensing and forming elements is simplified by incorporating these parts in the single unit 50 and on opposite sides of the pattern tape. Due to location of the forming and feeling elements in alinement with each other on the unit 50, the latter as well as the pattern occupies the same position relative to its supporting part during both the forming and feeling operations. Formation of each control element by a power actuated member alined with the feeler is achieved in a simple manner due to the shape of the control element 49 as a deformed portion of the tape rather than a hole or perforation. Thus, the necessity of disposing of the slug or portion punched out to form the hole is avoided.

I claim as my invention:

1. Positioning apparatus having, in combination, a carriage member, a base member supporting said carriage member for movement back and forth along a predetermined path, a pattern blank in the form of a tape supported on one of said members and extending longitudinally of said path, a pattern forming and feeler unit carried by the other of said members and having a slot therein to receive said tape, said unit comprising a forming element mounted on one side of said slot for movement transversely of the tape and into engagement therewith to form a control element extending transversely of the tape and a feeler mounted on the other side of said slot to move transversely of the tape in alinement with said forming element and yieldably urged toward and against the opposite side of the tape, and means controlling relative movement of said members in response to shifting of said feeler transversely of said tape upon engagement of the feeler with said control element during movement of said unit along the tape.

2. In positioning apparatus, the combination of, a base member having a guideway, a carriage member reciprocable along said guideway, power actuated feed mechanism acting between said members to shift the carriage member along said guideway, a pattern blank in the form of a tape mounted on one of said members and extending parallel to said guideway, a forming and feeler unit on the other of said members having a slot therein receiving said tape during shifting of the carriage along the guideway, said unit comprising a forming element mounted on one side of said tape to move into engagement therewith and form a control element and a feeler mounted on the opposite side of the tape to move toward and away from the same and to shift relative thereto upon engagement with said control element during advance of the unit along the tape, and means controlling said feed mechanism in response to shifting of said feeler upon engagement with said control element.

3. In a positioning apparatus for a machine tool, the combination of, two members mounted to shift back and forth relative to each other along a predetermined path, a pattern blank in the form of a tape mounted on one of said members and extending longitudinally of said path, forming mechanism movable with the other one of said members along and adjacent said tape and operable when actuated to form a control element constituting a projection on one side of the tape and a recess on the other side thereof, a feeler mounted on said other member to shift transversely of said tape and positioned on said other member to engage said control element when said members occupy the same positions relative to each other as they occupied during formation of the control element, said feeler, upon engagement with said control element, shifting transversely of said tape, power actuated feed mechanism acting between said members to shift the same relative to each other along said path, and means controlling said feed mechanism in response to transverse shifting of said feeler.

4. In a positioning apparatus, the combination of, two members mounted to shift back and forth relative to each other along a predetermined path, a pattern blank in the form of a tape mounted on one of said members and extending longitudinally of said path, forming mechanism movable with the other one of said members along and adjacent said tape and operable when actuated to form a control element constituting a projection on one side of the tape and a recess on the other side thereof, a feeler on said other member engageable with said tape and shiftable transversely thereof upon engagement with said control element, power actuated feed mechanism acting between said members to shift the same relative to each other along said path, and means controlling said feed mechanism in response to transverse shifting of said feeler.

5. In positioning apparatus, a pattern forming and feeler unit having, in combination, a support member having a slot therein adapted to receive a pattern in the form of a tape for movement relative to the latter, a forming element mounted in said member on one side of said slot for reciprocation transversely of a tape therein and into engagement with the latter to form a control element extending transversely of the tape, a feeler mounted in said member on the other side of said slot to move back and forth transversely of the tape along the line of reciprocation of said forming element and yieldably urged toward and against the opposite side of the tape, and means carried by said member and operable to give a signal in response to shifting of said feeler transversely of said tape upon engagement of the feeler and said control element during movement of said unit relative to and along the tape.

6. In positioning apparatus, a forming and feeler unit having, in combination, a supporting member having a slot adapted to receive a pattern in the form of a flat tape during movement of the latter and the unit relative to each other along the tape, a forming element mounted on said member on one side of said slot to shift transversely thereof and into engagement with one side of said tape to deform the latter and provide a control element projecting laterally therefrom, a feeler mounted on said member on the opposite side of said slot to shift transversely thereof and into engagement with the opposite side of the tape and shiftable transversely of the slot upon engagement with said control element, and means carried by said member and operable to give a signal in response to shifting of said feeler transversely of said tape upon engagement of the feeler and said control element during movement of said unit relative to and along the tape.

7. In positioning apparatus, a forming and feeler unit having, in combination, a supporting member having a slot adapted to receive a pattern in the form of a flat tape and defined on one side of the latter by a backing surface slidable relative to and along the tape, a forming element mounted on said member on said one tape side to shift transversely of said slot and into and out of engagement with said tape to deform the latter and provide a control element projecting laterally therefrom, a feeler mounted on said member on the opposite side of said tape for engagement with the latter and shiftable transversely of the slot toward and away from said backing surface, said feeler shifting transversely of the tape upon engagement with a control element thereon, and yieldable means on said member disposed on the same side of said slot as said feeler and engageable with said opposite tape side to urge the tape across the slot and against said backing surface during a feeling operation while permitting movement of the tape away from the backing surface during formation of a control element on the tape.

8. In a positioning apparatus for a machine tool, the combination of, two members mounted to shift back and forth relative to each other along a predetermined path, a pattern blank mounted on one of said members and extending longitudinally of said path, forming mechanism movable with the other one of said members along and adjacent said blank and operable when actuated to form on the blank a control element extending transversely of said path, a feeler mounted on said other member to shift tranversely of said path and positioned on said other member to engage said control element when said members occupy the same positions relative to each other as they occupied during formation of the control element, said feeler, upon engagement with said control element, shifting transversely of said path, power actuated feed mechanism acting between said members to shift the same relative to each other along said path, and means controlling said feed mechanism in response to transverse shifting of said feeler.

9. In a positioning apparatus, the combination of, two members mounted to shift back and forth relative to each other along a predetermined path, a pattern blank mounted on one of said members and extending longitudinally of said path, forming mechanism movable with the other one of said members along and adjacent said blank and operable when actuated to form on the blank a control element extending transversely of said path, a feeler on said other member engageable with said blank and shiftable transversely of said path upon engagement with said control element, power actuated feed mechanism acting between said members to shift the same relative to each other along said path, and means controlling said feed mechanism in response to transverse shifting of said feeler.

References Cited in the file of this patent
UNITED STATES PATENTS

| | | |
|---|---|---|
| 1,456,560 | Metropole et al. | May 29, 1923 |
| 1,683,581 | Shaw | Sept. 4, 1928 |
| 2,537,770 | Livingston et al. | Jan. 9, 1951 |
| 2,630,722 | Benzon | Mar. 10, 1953 |